(12) United States Patent
Li et al.

(10) Patent No.: US 11,629,022 B2
(45) Date of Patent: Apr. 18, 2023

(54) AUTOMATIC COILED MATERIAL SWITCHING DEVICE

(71) Applicant: Dongguan Areconn Precision Machine Co., Ltd, Guangdong (CN)

(72) Inventors: Genfa Li, Guangdong (CN); Mengchuan Pan, Guangdong (CN)

(*) Notice: Subject to any disclaimer, the term of this patent is extended or adjusted under 35 U.S.C. 154(b) by 349 days.

(21) Appl. No.: 17/257,597

(22) PCT Filed: Mar. 5, 2020

(86) PCT No.: PCT/CN2020/077950
§ 371 (c)(1),
(2) Date: Jan. 4, 2021

(87) PCT Pub. No.: WO2020/211560
PCT Pub. Date: Oct. 22, 2020

(65) Prior Publication Data
US 2021/0292120 A1 Sep. 23, 2021

(30) Foreign Application Priority Data
Apr. 17, 2019 (CN) .......................... 201910309756.7

(51) Int. Cl.
 *B65H 19/20* (2006.01)
 *B65H 19/10* (2006.01)
 *H01M 10/04* (2006.01)

(52) U.S. Cl.
 CPC ........... *B65H 19/20* (2013.01); *B65H 19/102* (2013.01); *H01M 10/0404* (2013.01);
(Continued)

(58) Field of Classification Search
 CPC ...... B65H 19/18; B65H 19/20; B65H 19/102; B65H 19/1847; B65H 2301/4641
 See application file for complete search history.

(56) References Cited

U.S. PATENT DOCUMENTS

| 4,108,391 A * | 8/1978 | Martinez ................ B65H 19/14 |
| | | 242/556.1 |
| 7,484,685 B2 * | 2/2009 | Kuckelmann .......... B65H 19/28 |
| | | 242/527.2 |

(Continued)

*Primary Examiner* — Sang K Kim
(74) *Attorney, Agent, or Firm* — Prakash Nama; Global IP Services, PLLC (57) ABSTRACT

Provided is an automatic coiled material switching device, which comprises a machine table (8), a left unwinding device (81), a right unwinding device (82) and a rotatory cutting device (83); wherein the machine table is provided with a left auxiliary roller (84), a right auxiliary roller (85) and a plurality of fixed rollers; the rotary cutting device comprises a bearing seat (1), a bearing (11) arranged on the bearing seat, a rotating main body (2) arranged on the bearing, a rotating mechanism for driving the rotating main body to rotate on the bearing seat, a turning mechanism for driving the bearing seat to turn around, and a driving mechanism; the rotating main body comprises an upper part (21) and a lower part (22); a gap (23) for allowing a material to pass through is formed between the upper part and the lower part; and the rotating body is provided with a pressing mechanism for compressing the material and a cutting mechanism for cutting the material. The automatic coiled material switching device implements the automatic switching of material belts of the left unwinding device and the right unwinding device by arranging the rotating main body, rotating mechanism, the turning mechanism, the driving mechanism, the pressing mechanism and the cutting mechanism.

7 Claims, 10 Drawing Sheets

(52) U.S. Cl.
CPC .............. *B65H 2301/418* (2013.01); *B65H 2301/46172* (2013.01); *B65H 2301/46312* (2013.01)

(56) References Cited

U.S. PATENT DOCUMENTS

| | | | |
|---|---|---|---|
| 7,516,916 B2 * | 4/2009 | Titz ..................... | B65H 19/102 |
| | | | 242/555.6 |
| 7,980,504 B2 * | 7/2011 | Butterworth ....... | B65H 19/1847 |
| | | | 242/555.3 |
| 11,390,480 B2 * | 7/2022 | Tsujimoto ............. | B65H 19/20 |

\* cited by examiner

AUTOMATIC COILED MATERIAL SWITCHING DEVICE

BACKGROUND OF THE INVENTION

The present invention relates to the technical field of battery manufacturing, and more particularly to an automatic coil-exchanging apparatus for a coil stock.

Domestic lithium-manganese battery manufacturers generally realize a fully automatic lithium-manganese battery winding process by means of manual operation. Under the increasing market demands, a skilled worker spends about one minute on manually winding a lithium-manganese battery. The low efficiency seriously hinders the development of enterprises. How to realize automatic winding has become an urgent need of the enterprises.

In the process of unwinding the coil stocks of an automatic winding machine, after the material of one coil stock is unwound, the machine needs to stop operating for the continuity of the material; then, the remaining material of the coil stock is manually cut off and adhered to a new coil. Therefore, the working efficiency is low.

BRIEF SUMMARY OF THE INVENTION

The object of the present invention is to overcome the above defects in the prior art and provide an automatic coil-exchanging apparatus for a coil stock which does not need to manually prepare stock and realizes fully automatic strip connection.

The object of the present invention is realized by means of the following technical solution: an automatic coil-exchanging apparatus for a coil stock, including a work table, and a left unwinding apparatus, a right unwinding apparatus and a rotary cutoff apparatus which are all disposed on the work table, wherein the rotary cutoff apparatus is disposed between the left unwinding apparatus and the right unwinding apparatus;

the work table is provided thereon with a left auxiliary roll, a right auxiliary roll, and a plurality of fixed rolls; the left auxiliary roll moves up and down between the left unwinding apparatus and the rotary cutoff apparatus; the right auxiliary roll moves up and down between the right unwinding apparatus and the rotary cutoff apparatus;

the rotary cutoff apparatus includes a bearing seat, a bearing disposed on the bearing seat, a rotating body disposed on the bearing, a rotating mechanism for driving the rotating body to rotate on the bearing seat, a swiveling mechanism for driving the bearing seat to rotate, and a drive mechanism for driving the bearing seat to move back and forth on the work table;

the rotating body includes an upper portion and a lower portion; a gap for a material to pass through is disposed between the upper portion and the lower portion; and the rotating body is provided with a pressing mechanism for pressing the material, and a cutting mechanism for cutting off the material.

The present invention is further configured as follows: the pressing mechanism includes a pressing block disposed in the gap, a first air chamber disposed at the upper portion, and a pressing piston disposed at the upper portion; one end of the pressing piston presses against the pressing block, and the other end of the pressing piston is disposed in the first air chamber; the rotating body is provided with a first air passage in communication with the first air chamber; the pressing mechanism further includes a first resetting member for resetting the pressing block;

the first resetting member is a first tension spring; one end of the first tension spring is connected to the pressing block; the other end of the first tension spring is connected to the rotating body; and a seal ring is disposed between the first air passage and the rotating body.

The present invention is further configured as follows: the cutting mechanism includes a cutting knife disposed in the gap, a cutting block connected to the cutting knife, a second air chamber disposed at the upper portion, and a cutting piston disposed at the upper portion; one end of the cutting piston presses against the cutting block, and the other end of the cutting piston is disposed in the second air chamber; the rotating body is provided with a second air passage in communication with the second air chamber; the cutting mechanism further includes a second resetting member for resetting the cutting knife;

the second resetting member is a second tension spring; one end of the second tension spring is connected to the cutting block; the other end of the second tension spring is connected to the rotating body; and a seal ring is disposed between the second air passage and the rotating body.

The present invention is further configured as follows: the rotating mechanism includes a rotary motor, a first synchronous wheel, a synchronous belt, and a second synchronous wheel; an output terminal of the rotary motor is connected to the first synchronous wheel; the first synchronous wheel and the second synchronous wheel are linked via the synchronous belt; and the second synchronous wheel and the rotating body are coaxially transmitted.

The present invention is further configured as follows: the swiveling mechanism includes a link, a motor seat, and a rotation motor disposed on the motor seat; one end of the link is connected to the rotation motor, and the other end of the link is connected to the rotating body; the drive mechanism is an air cylinder; an output terminal of the air cylinder is connected to the motor seat; a slide block is disposed at the bottom of the motor seat; and a slide rail slidably connected to the slide block is disposed on the work table.

The present invention is further configured as follows: the left unwinding apparatus and the right unwinding apparatus are both provided with a sensor for sensing a double-sided adhesive.

The present invention is further configured as follows: the fixed roll includes an immovable fixed roll, a left fixed roll, and a right fixed roll; and the immovable fixed roll is disposed between the left fixed roll and the right fixed roll.

The beneficial effects of the present invention: the present invention can automatically switch coil strips between the left unwinding apparatus and the right unwinding apparatus by configuring the rotating body, the rotating mechanism, the swiveling mechanism, the drive mechanism, the pressing mechanism and the cutting mechanism.

BRIEF DESCRIPTION OF THE DRAWINGS

The drawings are utilized to further describe the present invention.

However, the embodiments in the drawings do not constitute any limitation to the present invention, and a person skilled in the art can obtain other drawings according to the following drawings without involving an inventive effort.

DESCRIPTION OF REFERENCE SIGNS IN FIG. 1-14

1, bearing seat; 11, bearing; 12, first air passage; 13, second air passage; 2, rotating body; 21, upper portion; 22, lower portion; 23, gap; 31, pressing block; 32, first air chamber; 33, pressing piston; 34, first resetting member; 41, cutting knife; 42, cutting block; 43, second air chamber; 44, cutting piston; 45, second resetting member; 51, rotary motor; 52, first synchronous wheel; 53, synchronous belt; 54, second synchronous wheel; 61, link; 62, rotation motor; 63, motor seat; 64, air cylinder; 7, seal ring; 8, work table; 81, left unwinding apparatus; 82, right unwinding apparatus; 83, rotary cutoff apparatus; 84, left auxiliary roll; 85, right auxiliary roll; 86, immovable fixed roll; 87, left fixed roll; 88, right fixed roll; 91, coil stock head; 92, coil stock tail; 93, double-sided adhesive.

DETAILED DESCRIPTION OF THE INVENTION

The present invention will be further described in combination with the following embodiments.

Figure 1:
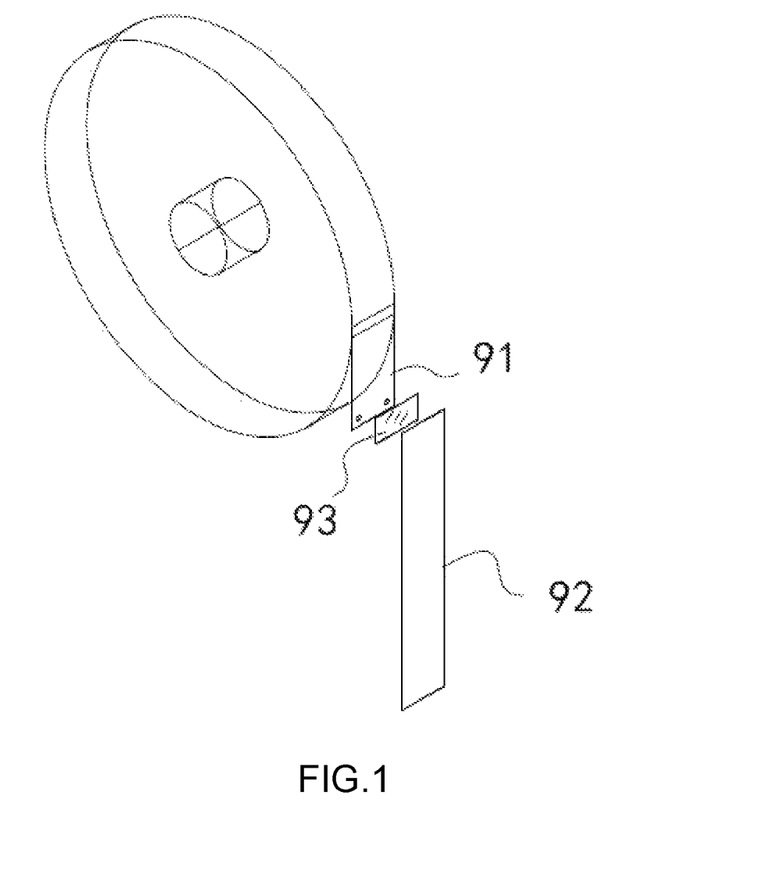
FIG. 1 is a structural schematic view of a coil stock according to the present invention.
Figure 2:
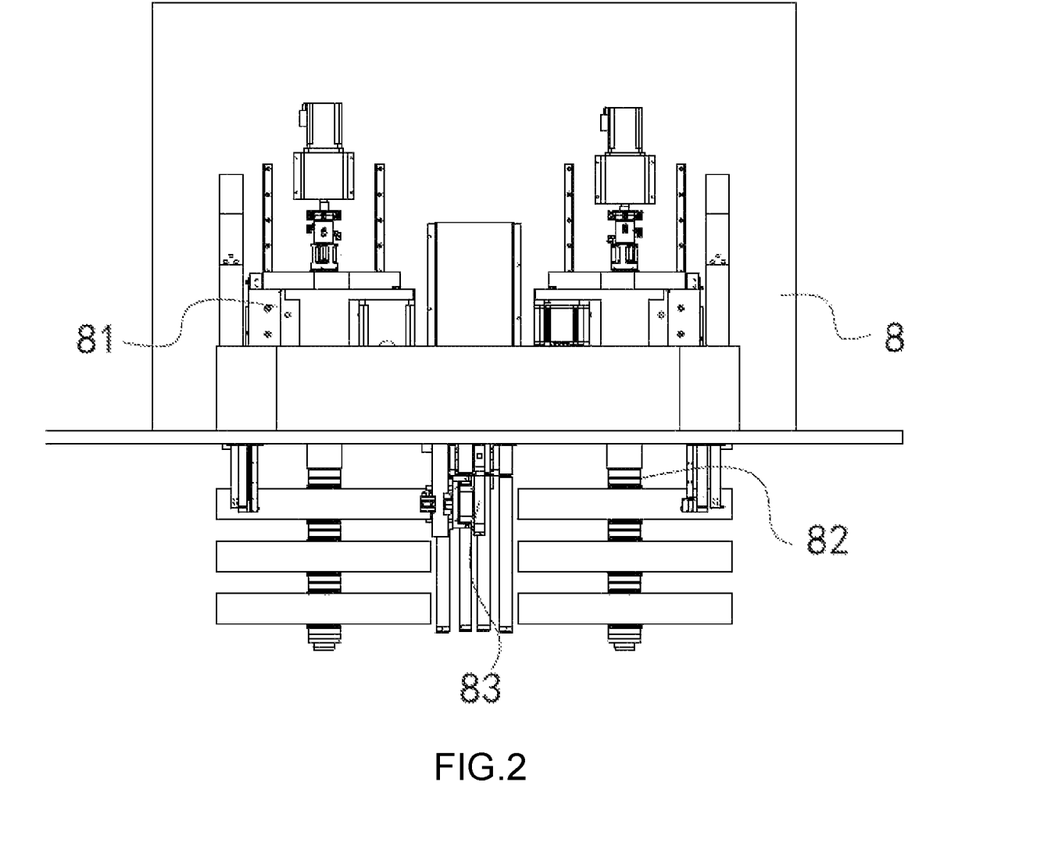
FIG. 2 is a vertical view according to the present invention.
Figure 3:
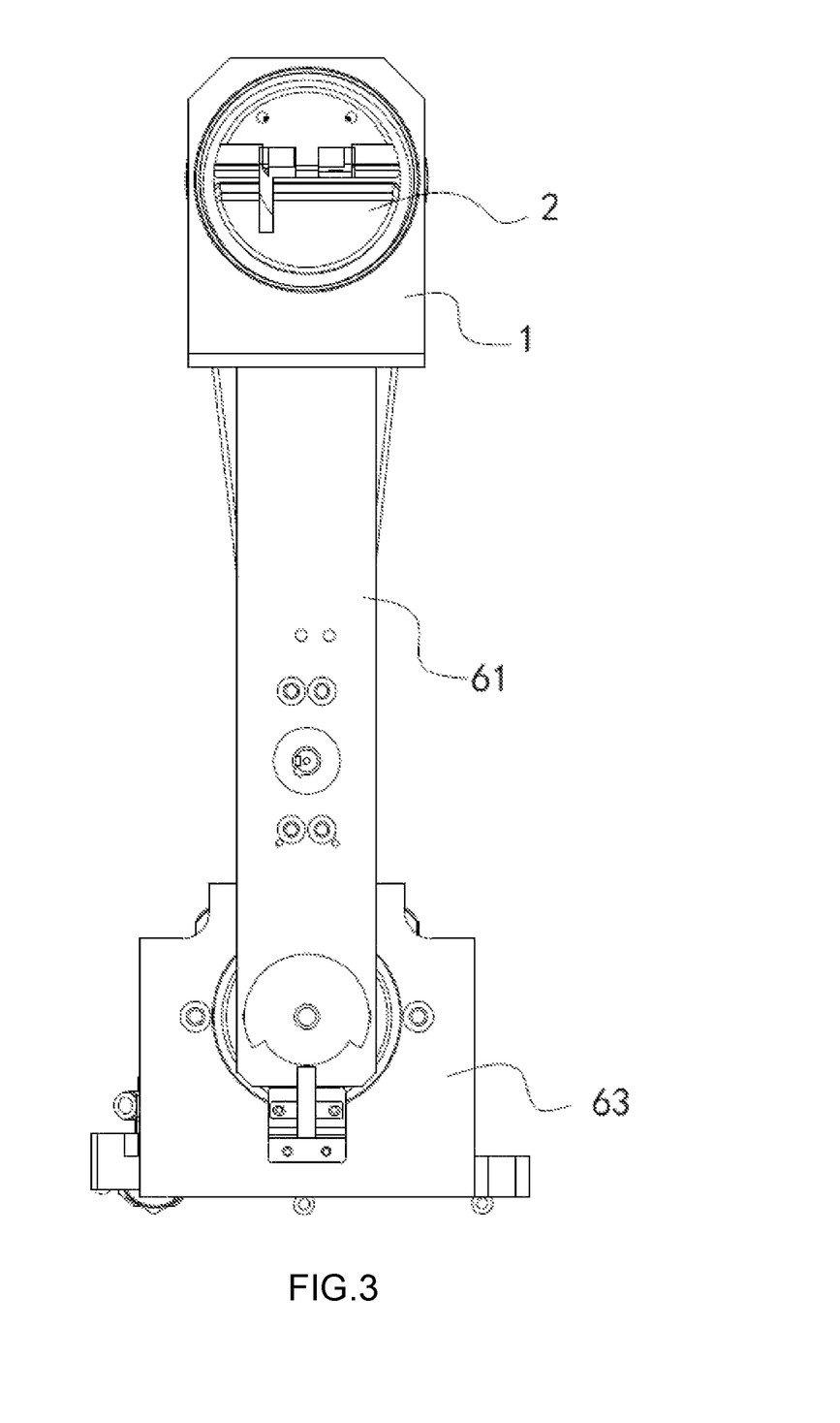
FIG. 3 is a structural schematic view of the rotary cutoff apparatus according to the present invention.
Figure 4:
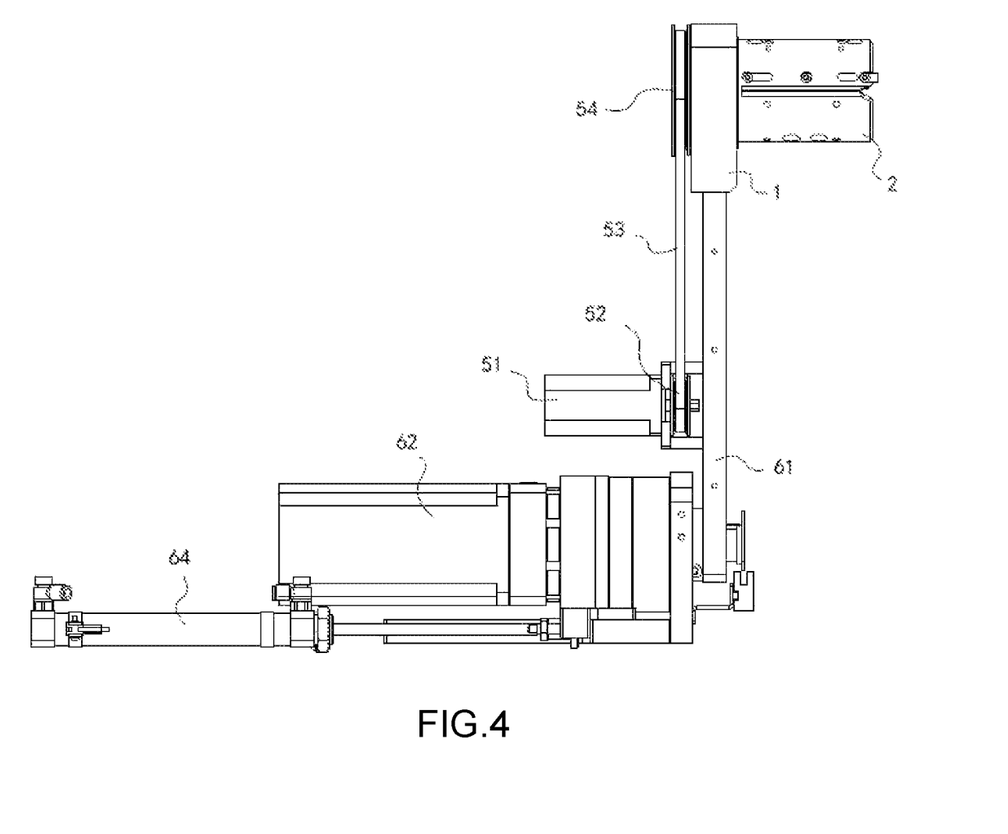
FIG. 4 is a side view of the rotary cutoff apparatus according to the present invention.
Figure 5:
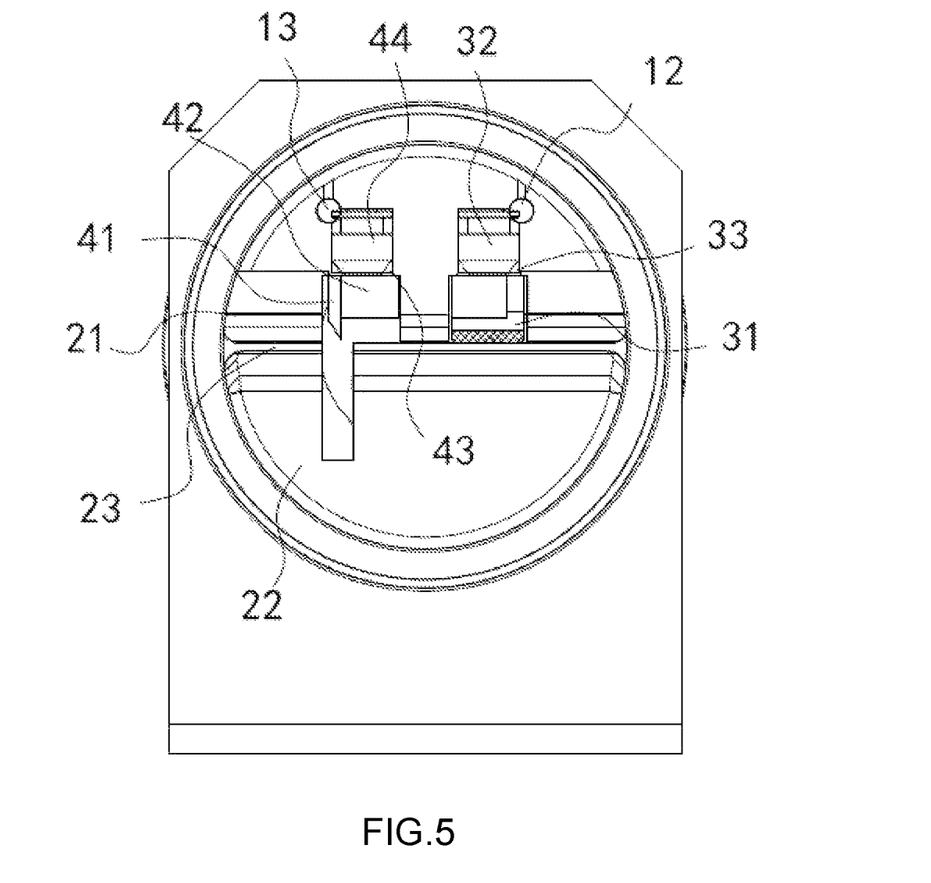
FIG. 5 is a front view of the rotating body according to the present invention.
Figure 6:
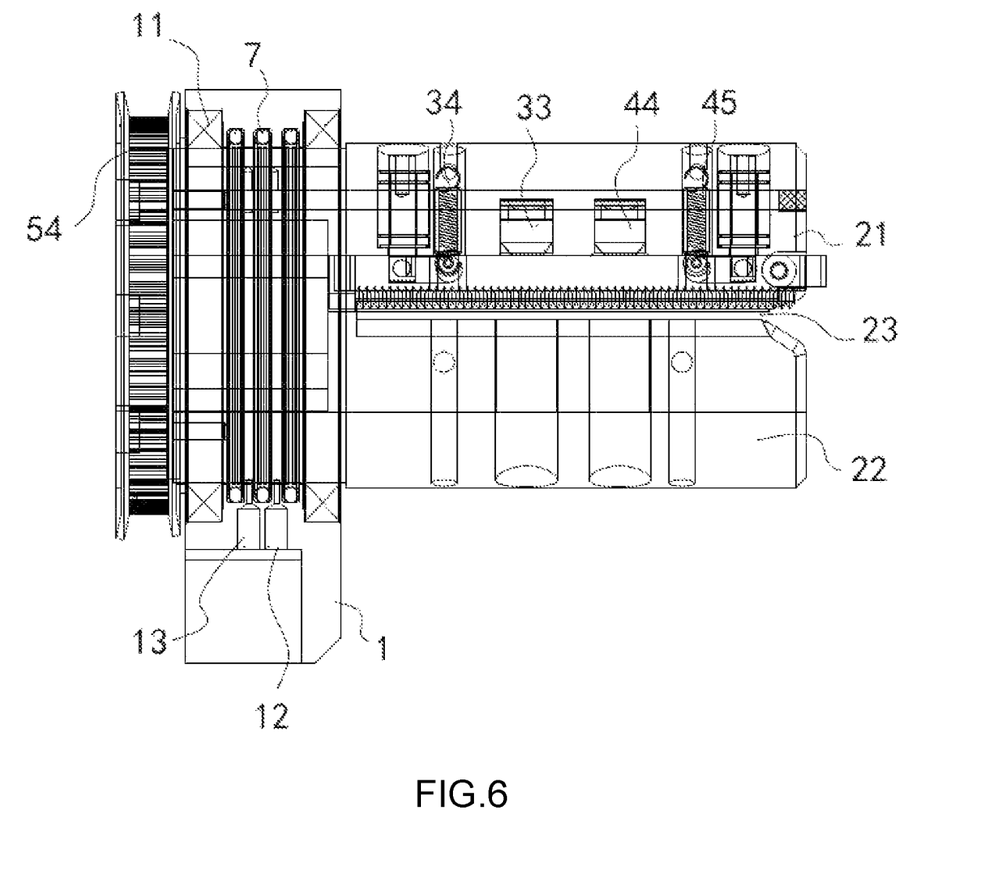
FIG. 6 is a sectional view of a lateral surface of the rotating body according to the present invention.

As shown in FIG. 1-14, in one embodiment, an automatic coil-exchanging apparatus for a coil stock, including a work table 8, and a left unwinding apparatus 81, a right unwinding apparatus 82 and a rotary cutoff apparatus 83 which are all disposed on the work table 8, wherein the rotary cutoff apparatus 83 is disposed between the left unwinding apparatus 81 and the right unwinding apparatus 82;

the work table 8 is provided thereon with a left auxiliary roll 84, a right auxiliary roll 85, and a plurality of fixed rolls; the left auxiliary roll 84 moves up and down between the left unwinding apparatus 81 and the rotary cutoff apparatus 83; the right auxiliary roll 85 moves up and down between the right unwinding apparatus 82 and the rotary cutoff apparatus 83; the fixed roll thereof has the effect of guiding material;

the rotary cutoff apparatus 83 includes a bearing 11 seat, a bearing 11 disposed on the bearing 11 seat, a rotating body 2 disposed on the bearing 11, a rotating mechanism for driving the rotating body 2 to rotate on the bearing 11 seat, a swiveling mechanism for driving the bearing 11 seat to rotate, and a drive mechanism for driving the bearing 11 seat to move back and forth on the work table 8;

the rotating body 2 includes an upper portion 21 and a lower portion 22; a gap 23 for a material to pass through is disposed between the upper portion 21 and the lower portion 22; and the rotating body 2 is provided with a pressing mechanism for pressing the material, and a cutting mechanism for cutting off the material.

Specifically, in the automatic coil-exchanging apparatus for a coil stock in the embodiment, before a coil stock is placed in the left unwinding apparatus 81 or the right unwinding apparatus 82, as shown in FIG. 1, first a coil stock head 91 is punched to form a through hole, then a double-sided adhesive 93 is adhered at the punched hole (the step is completed when the previous winding process is completed), and finally the coil stock is placed in the left unwinding apparatus 81 or the right unwinding apparatus 82 for unwinding;

when the material in the left unwinding apparatus 81 or the right unwinding apparatus 82 is used up, the drive mechanism drives the bearing 11 seat to move to a position in parallel with the coil stock; the swiveling mechanism drives the bearing 11 seat to deflect an angle to the left unwinding apparatus 81 or the right unwinding apparatus 82; the rotating mechanism drives the rotating body 2 to rotate an angle on the bearing 11 seat, such that a material plate or sheet enters the gap 23 between the upper portion 21 and the lower portion 22; then, the pressing mechanism operates to press the material, and the cutting mechanism operates to cut off the material plate or sheet, thus realizing automatic cutting of the material plate or sheet;

after the cutting is completed, the swiveling mechanism drives the bearing 11 seat to deflect an angle to another unwinding apparatus; the rotating mechanism drives the rotating body 2 to rotate an angle on the bearing 11 seat, such that the material cut off in the gap 23 is adhered to the double-sided adhesive 93 of a new coil stock, thus completing the automatic switching of coil stocks.

In the automatic coil-exchanging apparatus for a coil stock in the embodiment, the pressing mechanism includes a pressing block 31 disposed in the gap 23, a first air chamber 32 disposed at the upper portion 21, and a pressing piston 33 disposed at the upper portion 21; one end of the pressing piston 33 presses against the pressing block 31, and the other end of the pressing piston 33 is disposed in the first air chamber 32; the rotating body 2 is provided with a first air passage 12 in communication with the first air chamber 32; the pressing mechanism further includes a first resetting member 34 for resetting the pressing block 31; specifically, when the material enters the gap 23 between the upper portion 21 and the lower portion 22, the first air passage 12 is aerated with air; the air passes through the first air passage 12, enters the first air chamber 32, and pushes the pressing piston 33 to move downward, such that the pressing block 31 moves to the lower portion 22 and presses the material.

The first resetting member 34 is a first tension spring; one end of the first tension spring is connected to the pressing block 31; the other end of the first tension spring is connected to the rotating body 2; after the coil stock switching is completed, the air aeration to the first air passage 12 is stopped, and the first tension spring resets the pressing block 31 and the pressing piston 33.

A seal ring 7 is disposed between the first air passage 12 and the rotating body 2. The configuration of the seal ring 7 can prevent the air from leaking from the first air passage 12 and the rotating body 2.

In the automatic coil-exchanging apparatus for a coil stock in the embodiment, the cutting mechanism includes a cutting knife 41 disposed in the gap 23, a cutting block 42 connected to the cutting knife 41, a second air chamber 43 disposed at the upper portion 21, and a cutting piston 44 disposed at the upper portion 21; one end of the cutting piston 44 presses against the cutting block 42, and the other end of the cutting piston 44 is disposed in the second air chamber 43; the rotating body 2 is provided with a second air passage 13 in communication with the second air chamber 43; the cutting mechanism further includes a second resetting member 45 for resetting the cutting knife 41; specifically, after the pressing mechanism presses the material, the second air passage 13 is aerated with air; the air passes through the second air passage 13, enters the second air chamber 43, and pushes the cutting piston 44 to move downward, such that the cutting block 42 and the cutting knife 41 move to the lower portion 22, the cutting knife 41 cuts off the material.

The second resetting member 45 is a second tension spring; one end of the second tension spring is connected to the cutting block 42; the other end of the second tension spring is connected to the rotating body 2; after the cutting is completed, the air aeration to the second air passage 13 is stopped, and the second tension spring resets the cutting block 42 and the cutting piston 44.

A seal ring 7 is disposed between the second air passage 13 and the rotating body 2. The configuration of the seal ring 7 can prevent the air from leaking from the second air passage 13 and the rotating body 2.

In the automatic coil-exchanging apparatus for a coil stock in the embodiment, the rotating mechanism includes a rotary motor 51, a first synchronous wheel 52, a synchronous belt 53, and a second synchronous wheel 54; an output terminal of the rotary motor 51 is connected to the first synchronous wheel 52; the first synchronous wheel 52 and the second synchronous wheel 54 are linked via the synchronous belt 53; and the second synchronous wheel 54 and the rotating body 2 are coaxially transmitted. Specifically, when the rotating body 2 is required to rotate, the rotary motor 51 operates and drives the rotating body 2 to rotate via the first synchronous wheel 52, the synchronous belt 53, and the second synchronous wheel 54.

In the automatic coil-exchanging apparatus for a coil stock in the embodiment, the swiveling mechanism includes a link 61, a motor seat 63, and a rotation motor 62 disposed on the motor seat 63; one end of the link 61 is connected to the rotation motor 62, and the other end of the link 61 is connected to the rotating body 2; specifically, when the rotating body 2 needs to deflect to the left unwinding apparatus 81 or the right unwinding apparatus 82, the rotation motor 62 rotates an angle, and drives the link 61 and the rotating body 2 to adjust angles. The drive mechanism is an air cylinder 64; an output terminal of the air cylinder 64 is connected to the motor seat 63; a slide block is disposed at the bottom of the motor seat 63; and a slide rail slidably connected to the slide block is disposed on the work table 8.

In the automatic coil-exchanging apparatus for a coil stock in the embodiment, the fixed roll includes an immovable fixed roll 86, a left fixed roll 87, and a right fixed roll 88; and the immovable fixed roll 86 is disposed between the left fixed roll 87 and the right fixed roll 88. The above configurations facilitate the guiding and positioning of the material.

In the automatic coil-exchanging apparatus for a coil stock in the embodiment, the left unwinding apparatus 81 and the right unwinding apparatus 82 are both provided with a sensor for sensing the double-sided adhesive 93.

Figure 7:
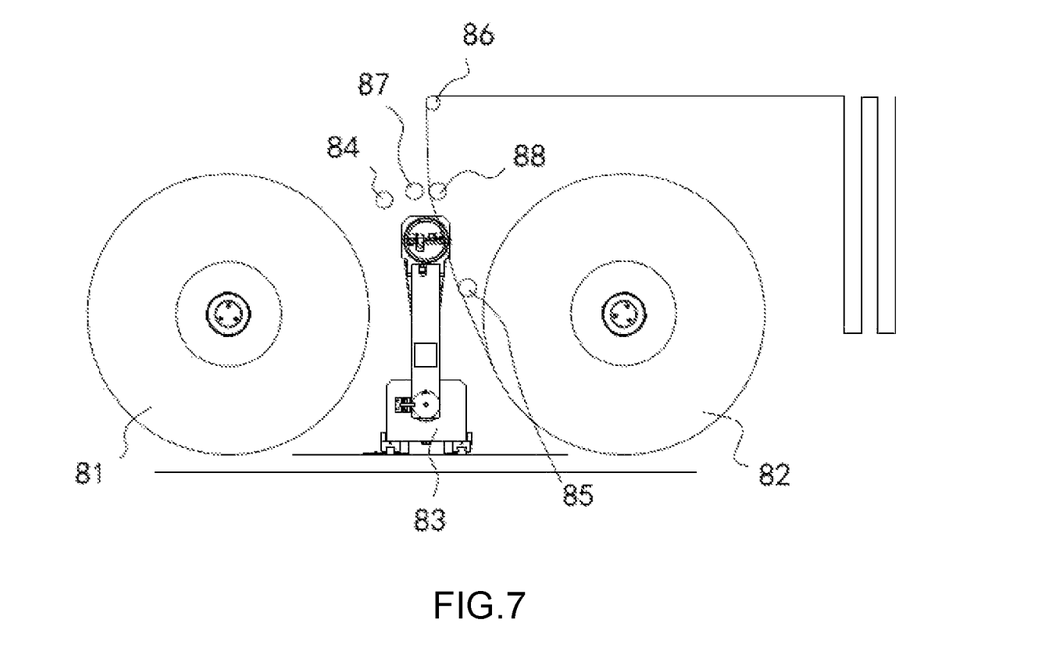
FIG. 7 is a schematic diagram when the right unwinding apparatus performs unwinding according to the present invention.
Figure 8:
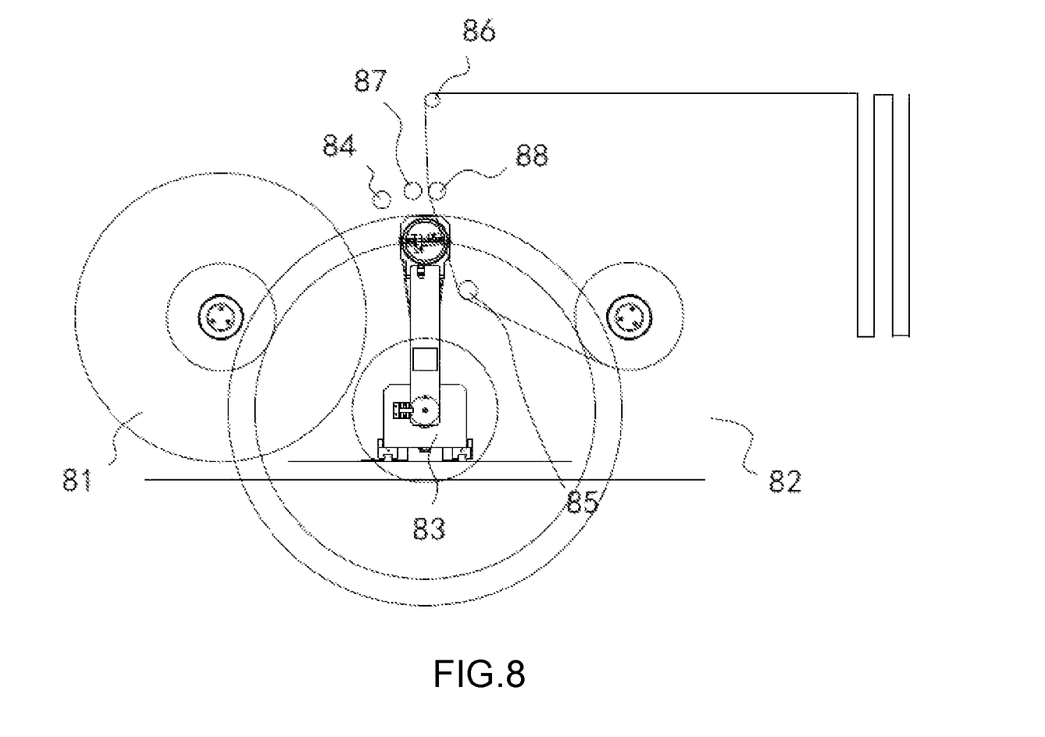
FIG. 8 is a schematic diagram after the right unwinding apparatus completes unwinding according to the present invention.
Figure 9:
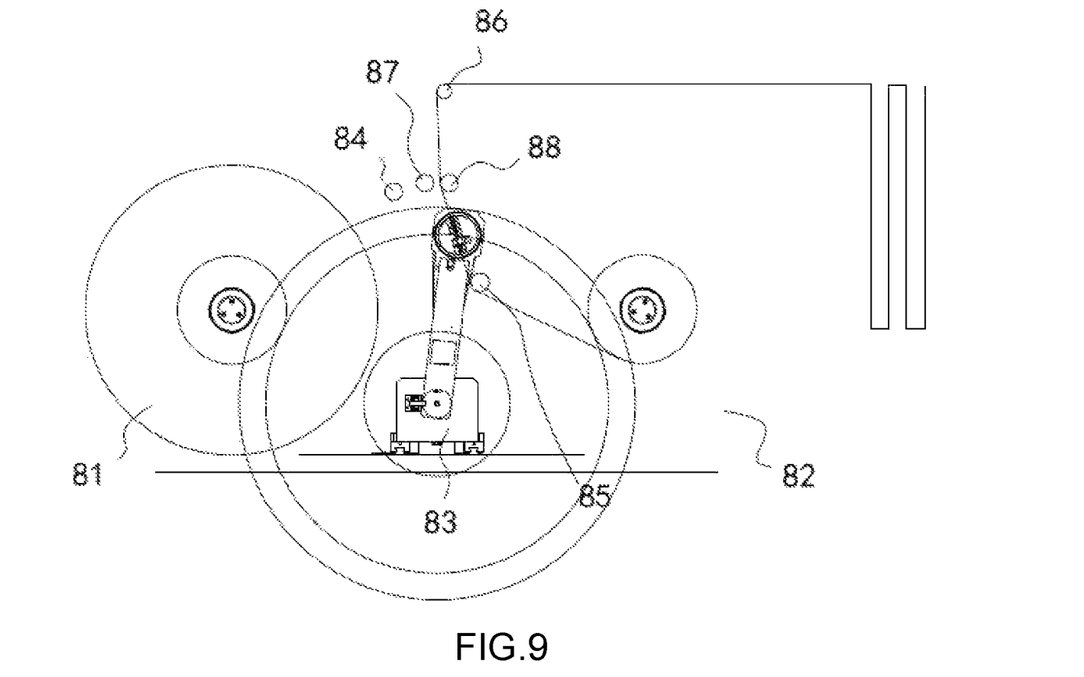
FIG. 9 is a schematic diagram when the right unwinding apparatus performs cutting according to the present invention.
Figure 10:
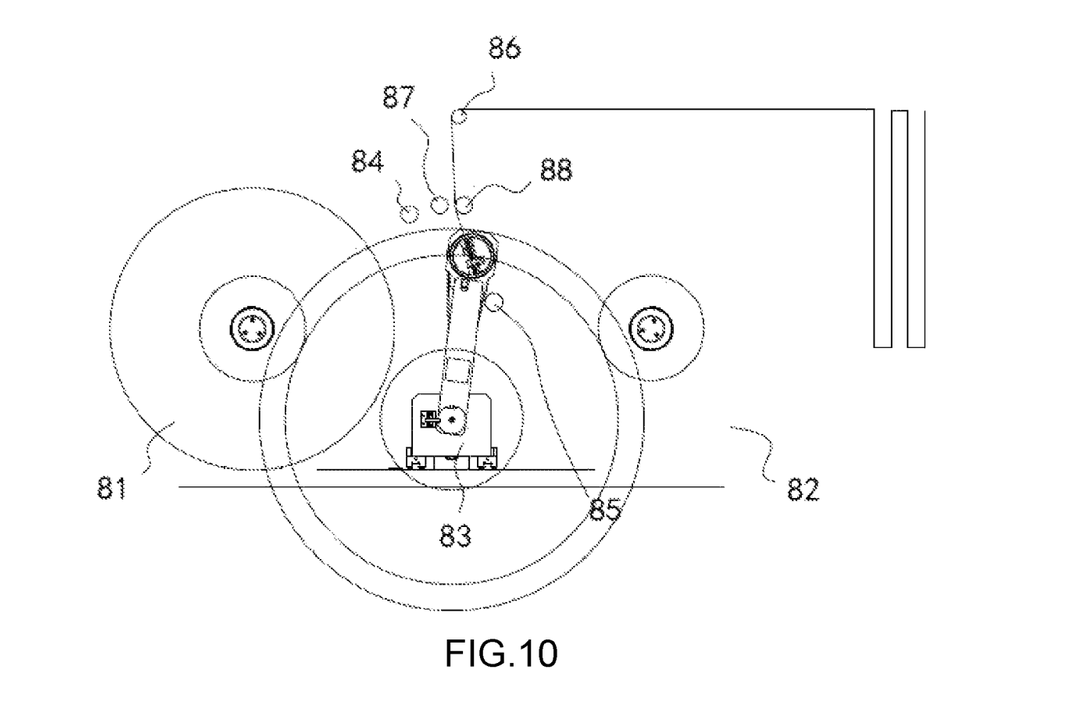
FIG. 10 is a schematic diagram after the right unwinding apparatus completes cutting according to the present invention.
Figure 11:
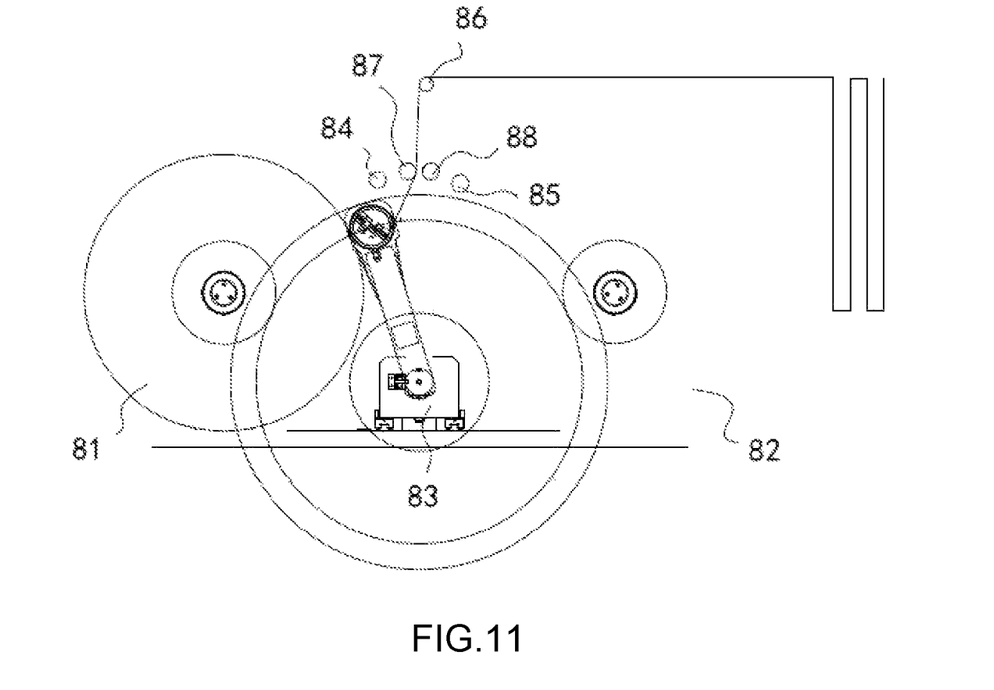
FIG. 11 is a schematic diagram when the left unwinding apparatus is adhered according to the present invention.
Figure 12:
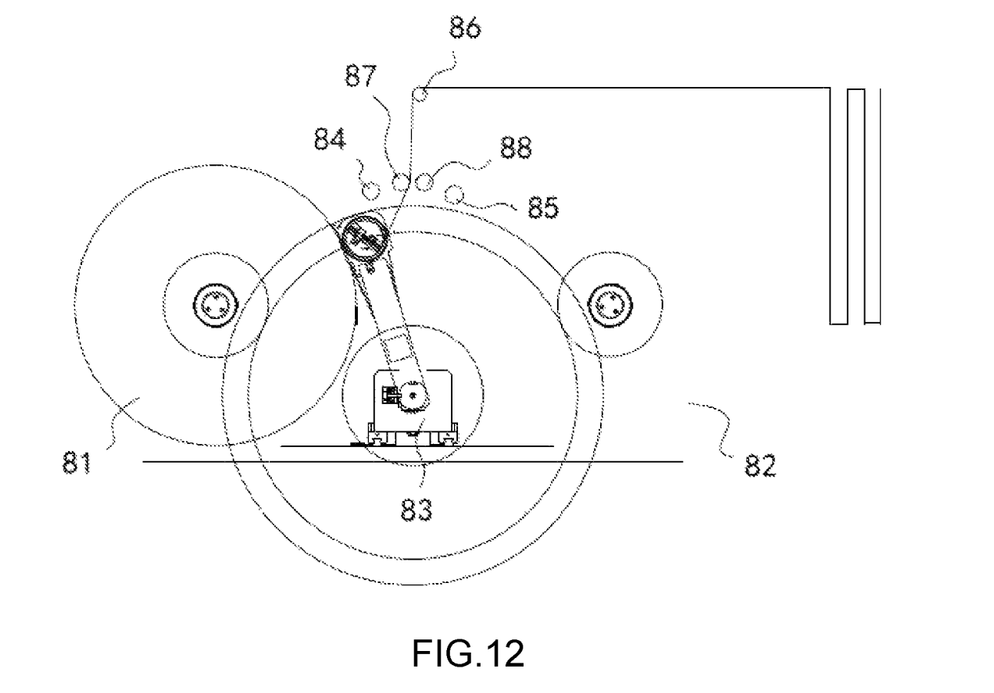
FIG. 12 is a schematic diagram after the right unwinding apparatus is adhered according to the present invention.
Figure 13:
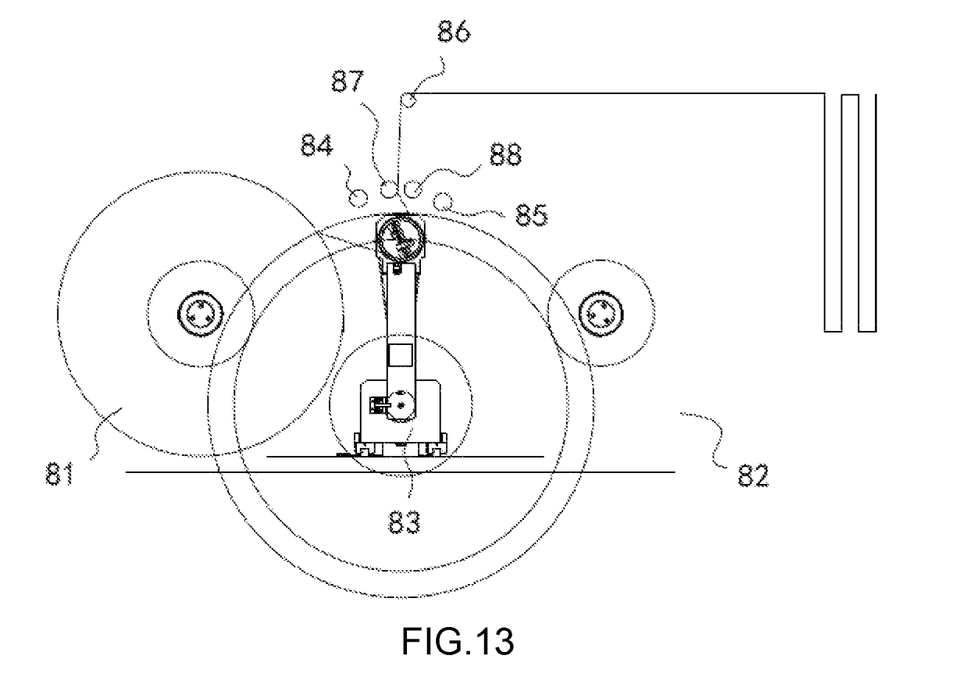
FIG. 13 is a schematic diagram after the rotating body is reset according to the present invention.
Figure 14:
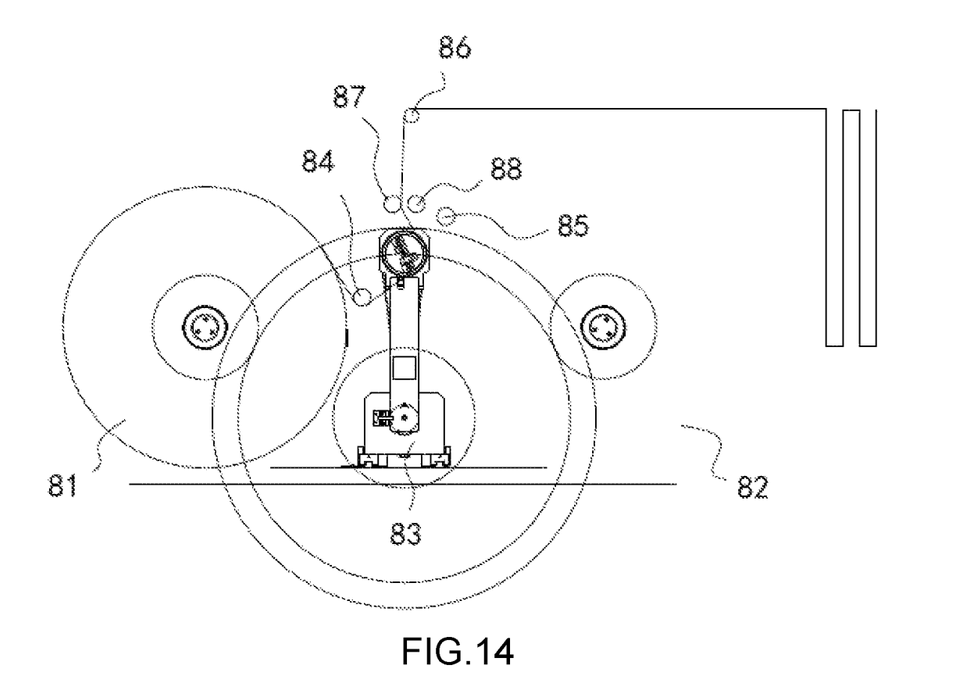
FIG. 14 is a schematic diagram after the coil stock is switched according to the present invention.

Specifically, in order to further understand the operating principle, the switching process is described as follows by taking the situation of switching the coil stock of the right unwinding apparatus 82 to the coil stock of the left unwinding apparatus 81 as an example:

As shown in FIG. 7, a right coil stock on the right unwinding apparatus 82 is in an unwinding state; the right auxiliary roll 85 is located at a lower position, and has the effect of guiding and positioning the right coil stock. As shown in FIG. 8, after the right coil stock is about to be used up, the left unwinding apparatus 81 rotates until the sensor senses the position of the double-sided adhesive 93. Then, as shown in FIG. 9, the swiveling mechanism drives the bearing 11 seat to deflect an angle to the right unwinding apparatus 82; and the rotating mechanism drives the rotating body 2 to rotate an angle on the bearing 11 seat, such that the material enters the gap 23 between the upper portion 21 and the lower portion 22; next, the pressing mechanism operates to press a coil stock tail 92, and the cutting mechanism operates to cut off the coil stock tail 92, so as to automatically cut off the material plate or sheet. As shown in FIG. 10, the pressing mechanism operates to press the coil stock tail 92. As shown in FIG. 11, the swiveling mechanism drives the bearing 11 seat to deflect an angle to the left unwinding apparatus 81. As shown in FIG. 12, the rotating mechanism drives the rotating body 2 to rotate an angle on the bearing 11 seat, such that the coil stock tail 92 is adhered to the double-sided adhesive 93 on the coil stock head 91 of a left coil stock. As shown in FIG. 13, after the adhesion is completed, the swiveling mechanism resets. As shown in FIG. 14, the left auxiliary roll 84 moves downward, and presses the material to have the guiding and positioning effects; then, the rotating mechanism drives the rotating body 2 to rotate an angle on the bearing 11 seat, and the pressing mechanism stops operating, such that the coil stock is pushed out from the gap 23, so as to complete the switching of the coil strips.

At last, it should be noted that the above embodiments are only used to describe the technical solution of the present invention, but not intended to limit the protection scope of the present invention. Although the present invention is described in detail with reference to preferred embodiments, a person skilled in the art should understand that the technical solution of the present invention can be modified or equivalently substituted without departing from the essence and scope of the technical solution of the present invention.

What is claimed is:

1. An automatic coil-exchanging apparatus for a coil stock, comprising a work table (8), and a left unwinding apparatus (81), a right unwinding apparatus (82) and a rotary cutoff apparatus (83) which are all disposed on the work table (8), wherein the rotary cutoff apparatus (83) is disposed between the left unwinding apparatus (81) and the right unwinding apparatus (82);

the work table (8) is provided thereon with a left auxiliary roll (84), a right auxiliary roll (85), and a plurality of fixed rolls; the left auxiliary roll (84) moves up and down between the left unwinding apparatus (81) and the rotary cutoff apparatus (83); the right auxiliary roll (85) moves up and down between the right unwinding, apparatus (82) and the rotary cutoff apparatus (83);

the rotary cutoff apparatus (83) comprises a bearing (11) seat, a bearing (11) disposed on the bearing (11) seat, a rotating body (2) disposed on the bearing (11), a rotating mechanism for driving the rotating body (2) to rotate on the bearing (11) seat, a swiveling mechanism for driving the bearing (11) seat to swivel, and a drive mechanism for driving the bearing (11) seat to move back and forth on the work table (8);

the rotating body (2) comprises an upper portion (21) and a lower portion (22); a gap (23) for a material to pass through is disposed between the upper portion (21) and the lower portion (22); and the rotating body (2) is provided with a pressing mechanism for pressing the material tightly, and a cutting mechanism for cutting off the material.

2. The automatic coil-exchanging apparatus for a coil stock according to claim 1, wherein the pressing mechanism comprises a pressing block (31) disposed in the gap (23), a first air chamber (32) disposed at the upper portion (21), and a pressing piston (33) disposed at the upper portion (21); one end of the pressing piston (33) presses against the pressing block (31), and the other end of the pressing piston (33) is disposed in the first air chamber (32); the rotating body (2) is provided with a first air passage (12) in communication with the first air chamber (32); the pressing mechanism further comprises a first resetting member (34) for resetting the pressing block (31);

the first resetting member (34) is a first tension spring; one end of the first tension spring is connected to the pressing block (31); the other end of the first tension spring is connected to the rotating body (2); and a seal ring (7) is disposed between the first air passage (12) and the rotating body (2).

3. The automatic coil-exchanging apparatus for a coil stock according to claim 1, wherein the cutting mechanism comprises a cutting knife (41) disposed in the gap (23), a cutting block (42) connected to the cutting knife (41), a second air chamber (43) disposed at the upper portion (21), and a cutting piston (44) disposed at the upper portion (21); one end of the cutting piston (44) presses against the cutting block (42), and the other end of the cutting piston (44) is disposed in the second air chamber (43); the rotating body (2) is provided with a second air passage (13) in communication with the second air chamber (43); the cutting mechanism further comprises a second resetting member (45) for resetting the cuffing knife (41);

the second resetting member (45) is a second tension spring; one end of the second tension spring is connected to the cutting block (42); the other end of the second tension spring is connected to the rotating body (2); and a seal ring (7) is disposed between the second air passage (13) and the rotating body (2).

4. The automatic oil-exchanging apparatus for a coil stock according to claim 1, wherein the rotating mechanism comprises a rotary motor (51), a first synchronous wheel (52), a synchronous belt (53), and a second synchronous wheel (54); an output terminal of the rotary motor (51) is connected to the first synchronous wheel (52); the first synchronous wheel (52) and the second synchronous wheel (54) are linked via the synchronous belt (53); and the second synchronous wheel (54) and the rotating body (2) are coaxially transmitted.

5. The automatic coil-exchanging apparatus for a coil stock according to claim 1, wherein the swiveling mechanism comprises a link (61), a motor seat (63), and a rotation motor (62) disposed on the motor seat (63); one end of the link (61) is connected to the rotation motor (62), and the other end of the link (61) is connected to the rotating body (2); the drive mechanism is an air cylinder (64); an output terminal of the air cylinder (64) is connected to the motor seat (63); a slide block is disposed at the bottom of the motor seat (63); and a slide rail slidably connected to the slide block is disposed on the work table (8).

6. The automatic coil-exchanging apparatus for a coil stock according to claim 1, wherein the left unwinding apparatus (81) and the right unwinding apparatus (82) are both provided with a sensor for sensing a double-sided adhesive (93).

7. The automatic coil-exchanging apparatus for a coil stock according to claim 1, wherein the fixed roll comprises an immovable fixed roll (86), a left fixed roll (87), and a right fixed roll (88); and the immovable fixed roll (86) is disposed between the left fixed roll (87) and the right fixed roll (88).

\* \* \* \* \*